United States Patent [19]
Bonnell

[11] Patent Number: 5,009,067
[45] Date of Patent: Apr. 23, 1991

[54] POWER TRANSMISSION

[75] Inventor: Raymond J. Bonnell, Waterford, Mich.

[73] Assignee: Vickers, Incorporated, Troy, Mich.

[21] Appl. No.: 254,402

[22] Filed: Oct. 6, 1988

[51] Int. Cl.$^5$ .............................................. G09B 25/02
[52] U.S. Cl. ........................................ 60/484; 91/459;
 91/1; 92/5 R; 434/219; 434/224; 434/365
[58] Field of Search ....................... 91/1, 459, DIG. 4;
 60/484; 92/5 R; 434/219, 224, 365, 366

[56] References Cited

U.S. PATENT DOCUMENTS

| | | | |
|---|---|---|---|
| 2,882,618 | 4/1959 | Thompson | 434/224 |
| 3,047,964 | 8/1962 | Fried | 434/219 X |
| 3,156,255 | 11/1964 | Gasquet et al. | 91/1 |
| 3,703,931 | 11/1972 | Page et al. | 91/459 X |
| 3,842,517 | 10/1974 | La Chance | 434/366 |
| 4,201,051 | 5/1980 | Hau | 60/484 X |
| 4,475,442 | 10/1984 | Breeden | 91/461 |
| 4,553,734 | 11/1985 | Oka et al. | 91/459 X |
| 4,650,425 | 3/1987 | McGarry | 434/224 X |
| 4,745,744 | 5/1988 | Cherry et al. | |
| 4,755,747 | 7/1988 | Blatter et al. | |
| 4,813,335 | 3/1989 | Wakiya et al. | 91/459 X |

FOREIGN PATENT DOCUMENTS 2021695 12/1979 United Kingdom .

OTHER PUBLICATIONS

ECC, The Training Company, Jan. 1977, "Aviation Week and Space Technology Vickers, Portable Hydraulic Trainer", Bulletin C-2100.
Vickers catalog entitled "Hydraulics Plus Electronics Systems and Components".

Primary Examiner—Carl D. Price
Attorney, Agent, or Firm—Barnes, Kisselle, Raisch, Choate, Whittemore & Hulbert

[57] ABSTRACT

Apparatus for training an operator in theory and practice of electrohydraulic control systems in accordance with a presently preferred embodiment of the invention comprises a plurality of electrohydraulic devices for performing hydraulic operations as differing functions of associated electronic control signals. A plurality of differing electronic controllers are each adapted to generate electronic control signals to operate at least one of the electrohydraulic devices. The electronic controllers bear indicia identifying the controller and associating each controller with corresponding electrohydraulic devices on the training unit. Each controller has a plurality of available input, output and control connections, which may be selectively interconnected with each other and with the electrohydraulic devices by suitable cables for configuring the controller and associated device in a multiplicity of differing operating modes. The electrohydraulic devices are connectable by quick-disconnect hoses to a fluid power source carried by the trainer, and are associated with indicia for generating a visually observable indication of operation at the devices, so that an operator can observe effects of differing electronic control configurations on the devices.

33 Claims, 12 Drawing Sheets

POWER TRANSMISSION

The present invention is directed to electrohydraulic control systems, and more particularly to apparatus for training an operator in theory and operation of electrohydraulic equipment and associated control electronics.

BACKGROUND AND OBJECTS OF THE INVENTION

Apparatus has heretofore been marketed by applicants' assignee for use as a training aid in theory and operation of hydromechanical fluid power systems. In such apparatus, a plurality of hydromechanical devices, such as fluid-operated hydraulic motors, valves and cylinders, are mounted on a vertical panel carried by a wheeled frame. An hydraulic pump is carried by the frame and selectively connectable by quick-disconnect hoses to one or more of the hydromechanical devices. All components are standard industrial devices with which the laboratory or classroom trainee thus becomes familiar through a series of exercises or problems set by an instructor or instruction manual. For training in electrohydraulics, which represents the current trend in the fluid power industry, an electrohydraulic servo trainer module is provided as a separate unit or as an accessory to the standard hydromechanical trainer.

Although the device described above has met with substantial commercial acceptance and success in both the academic and the industrial training environments, further improvements remain desirable. In particular, current industry trends to electrohydraulics, with a variety of sophisticated electronic control packages, is not well represented in prior art training apparatus. Further, where electrohydraulic trainer packages, such as the servo trainer module discussed above, have been provided as either a separate module or as an accessory to the standard hydromechanical trainer, the electronic control package has not been structured to provide maximum instructional assistance to the trainee, and has not been as well coordinated as desirable with the field manuals associated with the control electronics so that the trainee can become thoroughly familiar with the control electronics in the type of environment as will be encountered in the field.

Thus, there is a need in the art for training apparatus devoted specifically to electrohydraulic control theory and practice, that is versatile in terms of capability for training a student or technician in a wide variety of electronic control techniques, that forms an integral unit with which the trainee can readily become familiar, and in which the electronic control modules are so constructed and arranged as to provide enhanced trainee understanding of electronic control theory and practice, and are closely correlated with standard operator manuals and the like so that the trainee can become familiar with techniques for tailoring control parameters in a manner similar to that which will be encountered in the field. An object of the present invention is to provide an electrohydraulic training unit that fills one or more of these needs in the art.

SUMMARY OF THE INVENTION

Apparatus for training an operator in theory and practice of electrohydraulic control systems in accordance with a presently preferred embodiment of the invention comprises a plurality of electrohydraulic devices for performing hydraulic operations as differing functions of associated electronic control signals. A plurality of differing electronic controllers are each adapted to generate electronic control signals to operate at least one of the electrohydraulic devices. Preferably, the electronic controllers bear indicia identifying the controller and associating each controller with corresponding electrohydraulic devices on the training unit. Each controller has a plurality of available input/output and control connections, which may be selectively interconnected with each other and with the electrohydraulic devices by suitable cables for configuring the controller and associated device in a multiplicity of differing operating modes. The electrohydraulic devices are connectable by quick-disconnect hoses to a fluid power source carried by the trainer, and preferably are associated with indicia for generating a visually observable indication of operation at the devices, so that an operator can observe effects of differing electronic control configurations on the devices.

In the preferred embodiment of the invention, each of the electronic controllers takes the form of a standard electronic control assembly contained within an enclosure having an operator panel. The electrical schematic diagram of each control electronics package is printed on the associated operator panel in the same form as appears in the standard operator or maintenance manual associated with that controller. The input, output and control connections for each controller are positioned on the operator panel in coordination with the electrical schematic drawing printed thereon, and are connected to corresponding points in the associated electronic assembly. Each controller has facility on the operator panel for generating a command signal associated with desired motion at the electrohydraulic device to which the controller is connected. Further, all control adjustments which may be made in the field are indicated on the operator panel and available to the trainee. Sensors on the electrohydraulic devices may be connected to the controllers as return or feedback signals to form closed-loop servo control systems. Thus, the trainee may selectively interconnect the input, output and control terminals of each control electronics package in any number of differing configurations and observe the effects on motion at the associated electrohydraulic devices. Quick-disconnect hoses and electrical interconnecting cables are all supplied with the trainer, to form a complete training package.

Most preferably, the electrohydraulic devices are mounted on a vertical panel carried by a wheeled base. The electronic controllers form separate modules carried by the base beneath and in front of the device panel. The base includes a closed cabinet containing an hydraulic pump and sump forming a fluid source connectable to the hydraulic devices.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
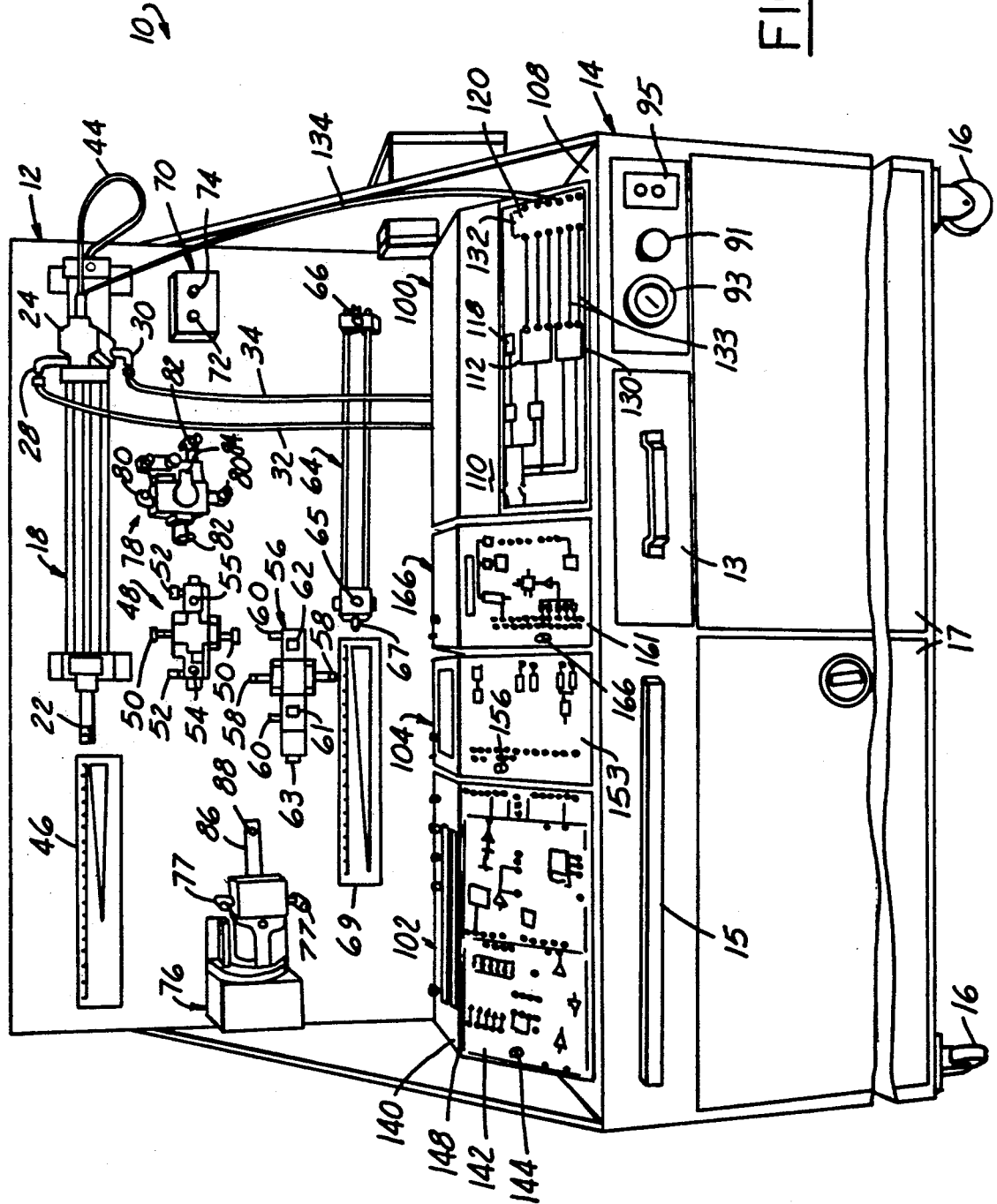
FIG. 1 is a front elevational view of electrohydraulic training apparatus in accordance with a presently preferred embodiment of the invention.

FIG. 1 illustrates apparatus 10 in accordance with a presently preferred embodiment of the invention as comprising a vertical panel 12 upstanding from the rear side of a closed generally horizontal rectangular cabinet 14. Cabinet 14 is carried by heavy duty casters 16 for enhanced mobility. Cabinet 14 has hinged doors 17 for enclosing a supply of quick-disconnect hoses and cables, a pull-out writing surface 15 and a drawer 13. A plurality of electrohydraulic devices are mounted on the front surface of panel 12 above cabinet 14.

Referring to both FIGS. 1 and 2A–2H, the panel-mounted electrohydraulic devices preferably include a linear actuator 18 that slidably encloses an associated piston 20 having a piston rod 22 axially extending from one actuator end. A servo valve assembly 24, which includes an on-board microprocessor-based controller 26, is mounted on the housing of actuator 18. A pair of nipple fittings 28, 30 extend from servo valve 24 for selective connection to a source of hydraulic fluid through quick-disconnect fluid hoses 32, 34 (FIG. 1). Valve 24 also has ports connected in assembly with actuator 18 to feed hydraulic fluid to opposing sides of piston 20 under control of controller 26. A position sensor 36 comprises an annular magnet 38 carried by actuator piston 20. An electroacoustic waveguide 40 is carried by the actuator cylinder and is encircled by magnet 38. A conductor 42 projects into waveguide 40 and is connected by a cable 44 to position feedback electronics within controller 26 for determining position of piston 20 within actuator 18 as a function of axial position of magnet 38 relative to waveguide 40. A label 46 (FIG. 1) is positioned axially adjacent to piston rod 22 externally of actuator 18 and bears indicia which may be observed by an operator to indicate motion of rod 22 in the axial direction.

A proportional solenoid valve 48 is mounted on panel 12 beneath actuator 18. Valve 48 has nippled fittings 50 suitable for connection by quick-disconnect hoses to a source of hydraulic fluid, and fittings 52 for connection to a valve-controllable load. Valve 48 also has terminals 54, 55 for selective electric connection to suitable duty cycle modulation control electronics. A second proportional solenoid valve 56, this time constructed to be responsive to pulse frequency modulated electronic control, is mounted on panel 12 beneath valve 48. Valve 56 has fittings 58 for connection to a hydraulic fluid source, and fittings 60 for connection to a controllable load. Connectors 61, 62 provided for connection of control electronics to the solenoids of valve 56, and a third connector 63 provides for feedbacking signals indicative of valve spool position. A servo valve 78 has fittings 80 for connection to a fluid source, and fittings 82 for connection to a motor 86, cylinder 18 or cylinder 64. Valve 78 also has a connector 84 for coupling to control electronics.

A second linear actuator 64 is positioned beneath and to the right of valves 48, 56, having fittings 66 for selective connection by suitable quick-disconnect hoses to fittings 52, 60, 82 of valve 48, 56, 78 respectively. A position sensor 36 is connected to the piston 68 of actuator 64 for providing a position feedback signal at connector 65 as previously described. A label 69 is positioned adjacent to the end of piston rod 67 to indicate axial motion thereof. (As an optional mode of operation, servo valve 24 may be removed from cylinder 18 and replaced by servo valve 78. When this option is employed, the feedback signal from sensor 40 must be conditioned by an amplifier 70.) Amplifier 70 is positioned above actuator 64 and has a first connector 72 for receiving the output of sensor 36 and a second connector 74 for feeding the conditioned and amplified sensor output to control electronics.

A hydraulic motor 76 is mounted on panel 12 to the left of valves 48, 56. Motor 76 has fittings 77. The shaft of motor 76 is connected to a tachometer 86 with a connection terminal 88 for providing a feedback signal to control electronics indicative of velocity of motor 76. A pump 90 (FIG. 2) is positioned within cabinet 14 (FIG. 1) for feeding hydraulic fluid under pressure from a sump or reservoir 92 to a fitting 94. Displacement of pump 90 is controlled by a knob 91 accessible to the operator at the front of cabinet 14. Pump output pressure is indicated at a gage 93 positioned adjacent to knob 91. A second fitting 96 provides a return path for hydraulic fluid to sump 92. Thus, fittings 94 and 96 may be connected, as by hoses 32, 34 (FIG. 1), to provide hydraulic fluid under pressure to one or more of the electrohydraulic devices mounted on panel 12. Additional hoses 32, 34 are stored in cabinet 14. Operator start/stop pushbuttons 95 are positioned adjacent to knob 91.

Four electronic controller modules 100, 102, 104 and 106 are mounted on the horizontal upper surface 108 of cabinet 14 beneath and in front of panel 12 and the various electrohydraulic devices carried thereon. Each controller module 100-106 comprises an enclosure or cabinet containing a complete electronic controller assembly. The controller cabinets have sloping operator front panels which are disposed in substantially co-planer alignment in assembly. As summarized above, and as will be described in greater detail hereinafter, each controller front panel bears detailed electrical schematic indicia of the associated controller electronics, as well as a multiplicity of female terminal jacks for selective interconnection of input and output controls. Controller module 100 is specifically adapted for controlling operation of servo valve assembly 24, and thus for controlling position of actuator rod 22. Controller module 102 is specifically adapted for controlling operation of servo valve 78. Controllers 104, 106 are specifically adapted for controlling operation of proportional solenoid valves 48, 56 respectively.

In accordance with an important feature of the present invention, all of the electrohydraulic equipment and controllers of training apparatus 10 comprise standard industrial components, in this case components of applicants' assignee's electrohydraulic equipment product line selected as being representative for training purposes.

The following table correlates the electrohydraulic devices and controllers hereinabove identified with specific equipment marketed by applicant's assignee:

TABLE 1

| Device/Controller | Vickers Model No. |
|---|---|
| Actuator 18 | XLA Cylinder |
| Servo valve/controller 24, 26 | DCL Servo Valve |
| Solenoid Valve 48 | KDG4V-3 |
| Controller 104 | EM-VT-24-10 |
| Solenoid Valve 56 | KDG1-3A |
| Controller 106 | KDG1-3A/5A |
| Motor 76 | MFB 5 |
| Servo valve 78 | SM4-20 |
| Controller 102 | EMD-20 Amplifier |
| | EMJ-10 Programmer |
| | EMK-10 Ramp Mod. |
| | EMP-A-20 Power Supply |
| Actuator 64 | T-J Cylinder |

As previously noted, the devices and controllers listed in Table 1 are standard components heretofore marketed by applicants' assignee. With the exception of the cylinders and the DCL servo valve assembly, the components of Table 1 are illustrated, for example, in Vickers Catalog 400 "Hydraulics Plus Electronics Systems and Components" (1985). DCL servo valve 24 and associated controller 26 are disclosed in U.S. Pat. No. 4,757,747 assigned to applicant's assignee. Position sensors 36 and amplifier 70 are marketed by Temposonics, Inc. of Plainview, N.Y. and disclosed in U.S. Pat. No. 3,898,555. The disclosures of the noted Catalog relative to the devices enumerated in Table 1, and of the noted U.S. patents, are incorporated herein by way of background.

Figure 3A:
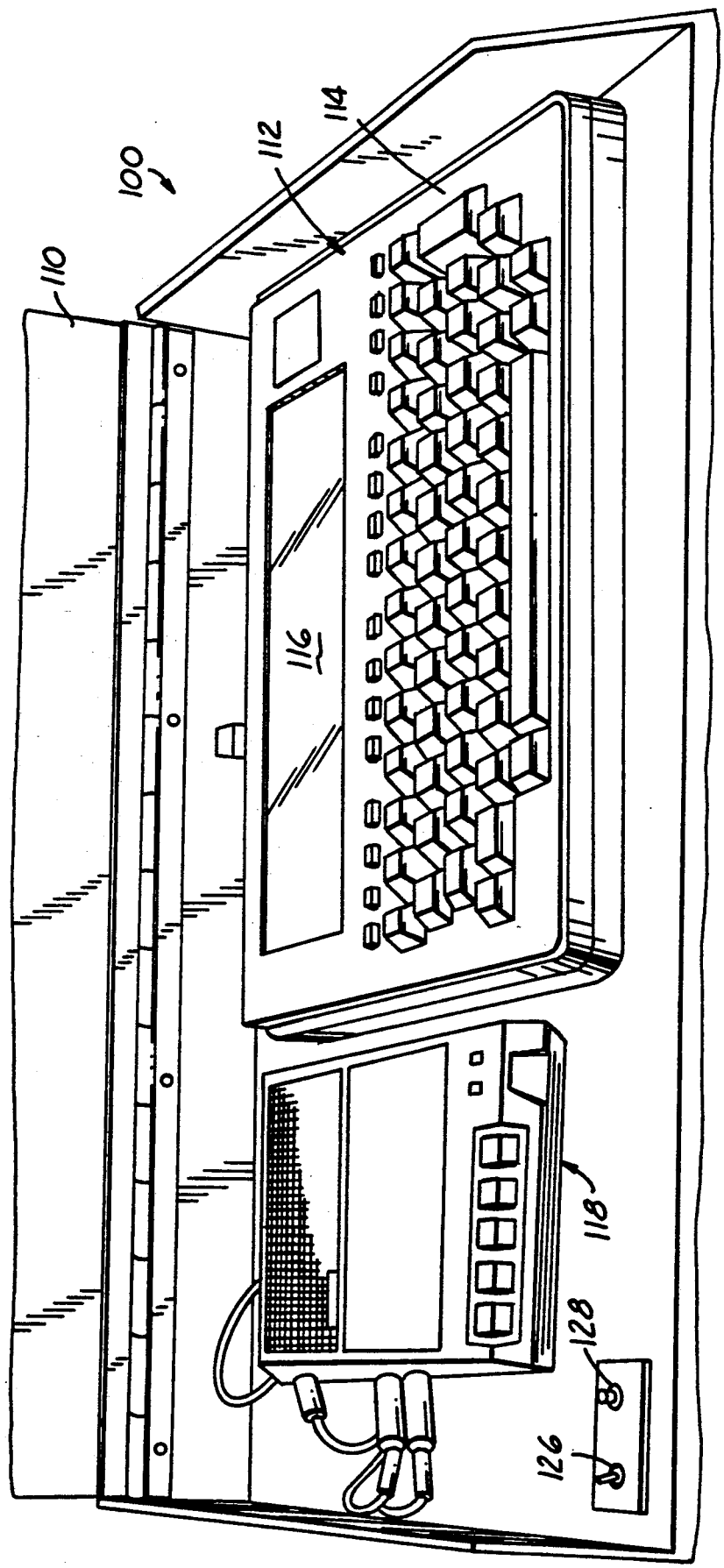
FIGS. 3A and 3B together form a front perspective view of a first electronic control module 100 in the apparatus of FIG. 1.
Figure 3B:
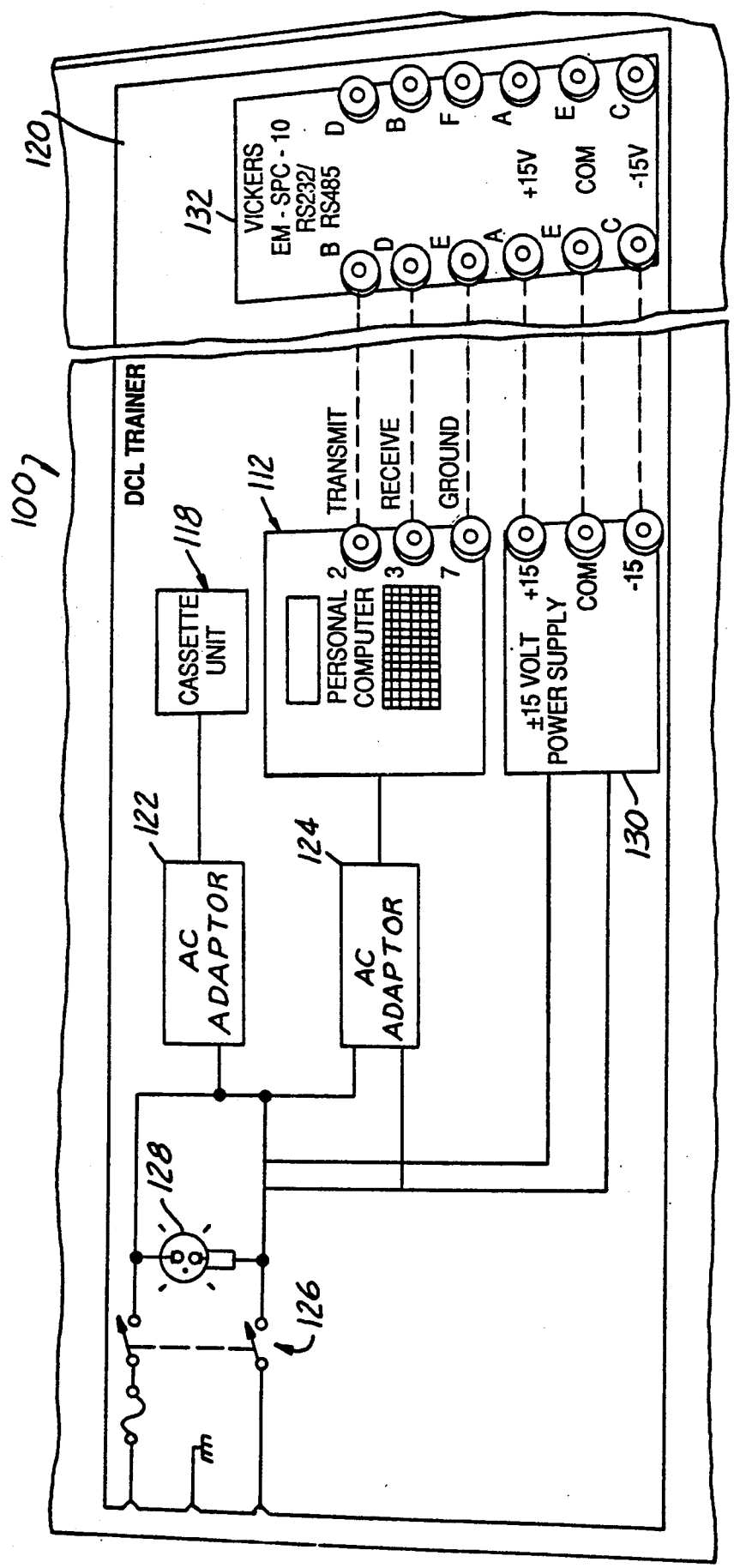

Referring to FIGS. 1, 3A and 3B controller 100 includes a hinged top 110 which may be pivoted upwardly to expose a personal computer 112 having a keyboard 114 and a display 116, and a cassette player 118 for loading suitable control programs into computer 112. As shown in FIG. 3B, computer 112 has serial transmit and receive ports electrically connected to single-conductor plug-type jacks or receptacles positioned on the sloping front panel 120 of controller 100. As also shown on panel 120, both cassette unit 118 and personal computer 112 receive power through associated AC adapters 122, 124 (contained within controller 100) from an operator power switch 126 (FIGS. 3A and 3B). A lamp 128 shows application of power to the cassette unit and personal computer, and also to a power supply 130 having output terminals connected to receptacles on panel 120. Controller 100 also includes a bus adapter 132 schematically illustrated on panel 120 with input and output terminals connected to receptacles on panel 120. Adapter 132 is disclosed in U.S. Pat. No. 4,745,744 assigned to the assignee hereof and incorporated herein by reference. Electrohydraulic bus communications are also discussed in U.S. Pat. No. 4,744,218 likewise assigned to the assignee hereof and incorporated for background.

Figure 2A:
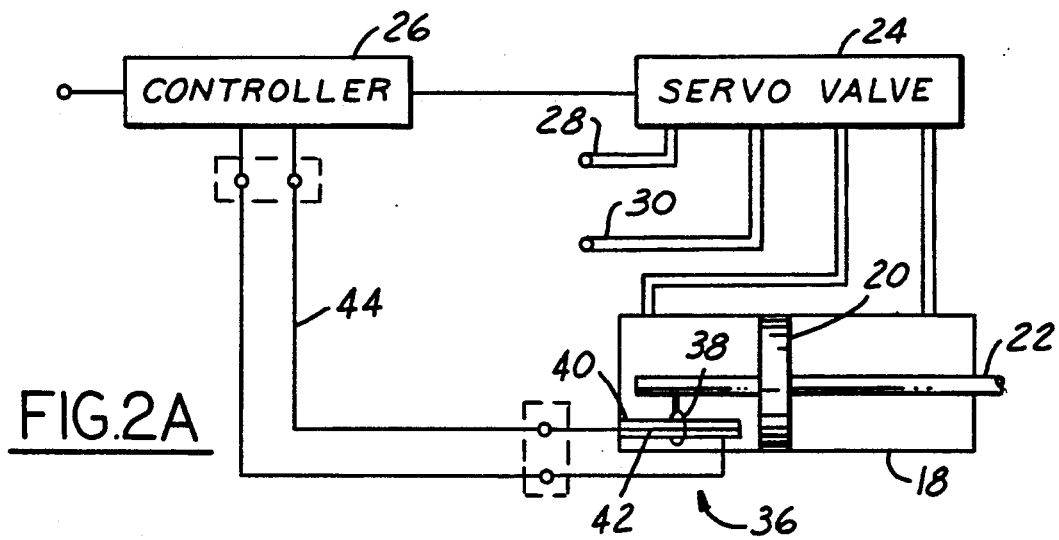
FIGS. 2A–2H is a schematic diagram of the electrohydraulic devices in the apparatus of FIG. 1.
Figure 2B:
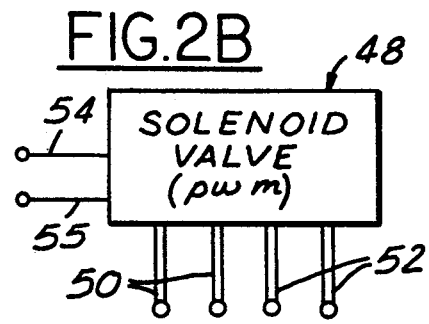
Figure 2C:
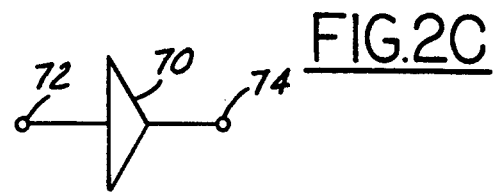
Figure 2D:
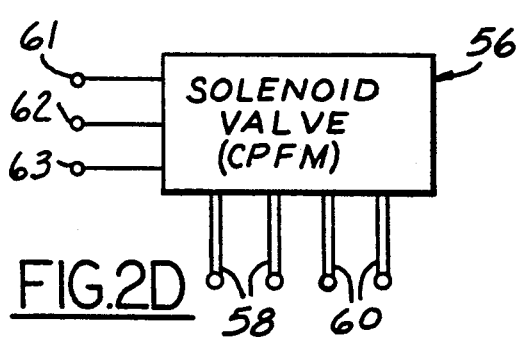
Figure 2E:
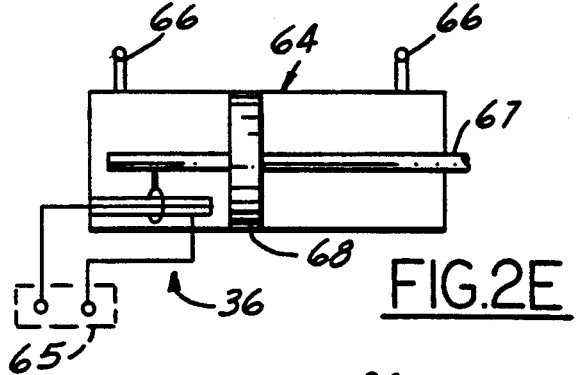
Figure 2F:
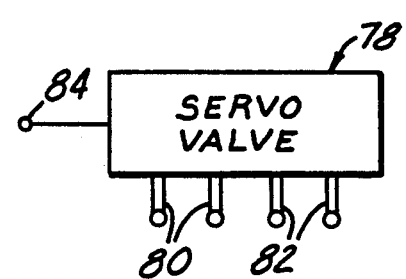
Figure 2G:
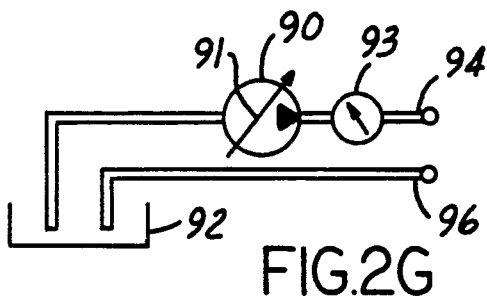
Figure 2H:
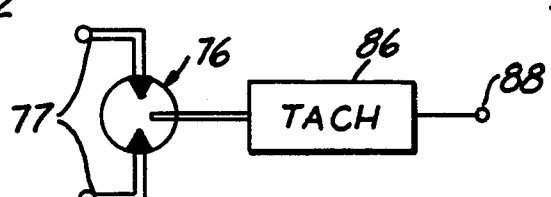

Thus, to operate controller 100, valve assembly 24 (FIG. 1) and actuator 18, the i/o terminals of personal computer 112 and power supply 130, presented at associated receptacles on controller front panel 120, are connected by the operator, using suitable leads 133 (FIG. 1) supplied with the trainer, to the associated input receptacles of adapter 132. The adapter output plugs are connected by cable 134 (FIG. 1) to the input terminal of controller 26 (FIG. 2A) in valve assembly 24 (FIGS. 1 and 2A). Suitable control programming is downloaded from cassette unit 118 to computer 112, and the control parameters thereof may be selectively varied by the operator during training exercises at computer keyboard 114 so as to obtain desired motion at valve 24 and actuator 18. The valve control programming does not itself form part of the present invention. However, by way of background, U.S. Pat. Nos. 4,502,109, 4,581,699, 4,612,489, 4,625,622, 4,643,074, 4,651,272, 4,714,005, and 4,744,218 disclose systems suitable for implementation in microprocessor-based digital control of electrohydraulic devices such as servo valve-controlled actuators.

Figure 4A:
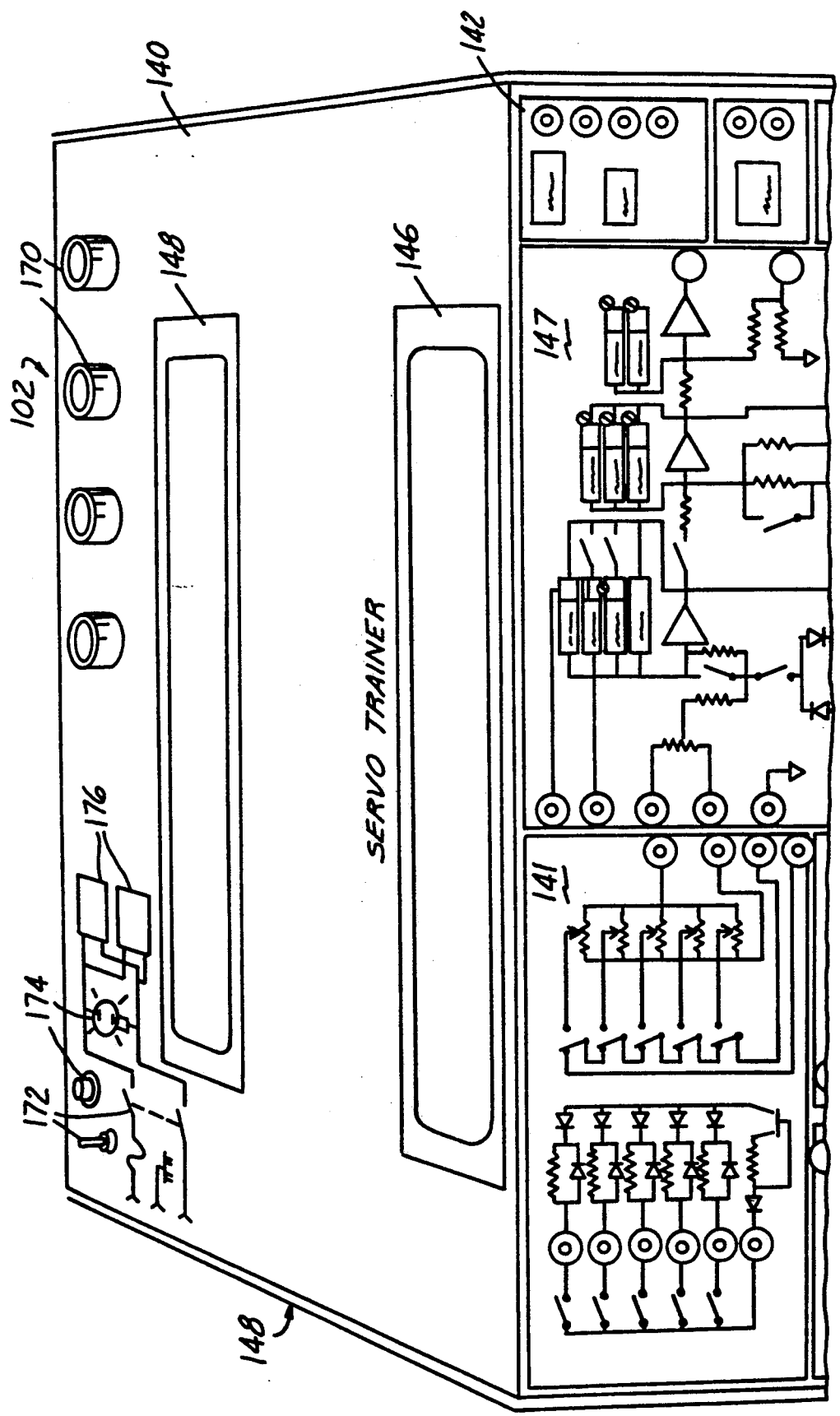
FIGS. 4A, 4B, 4C and 4D together form a front perspective view of a second electronic control module 102 in the apparatus of FIG. 1.
Figure 4B:
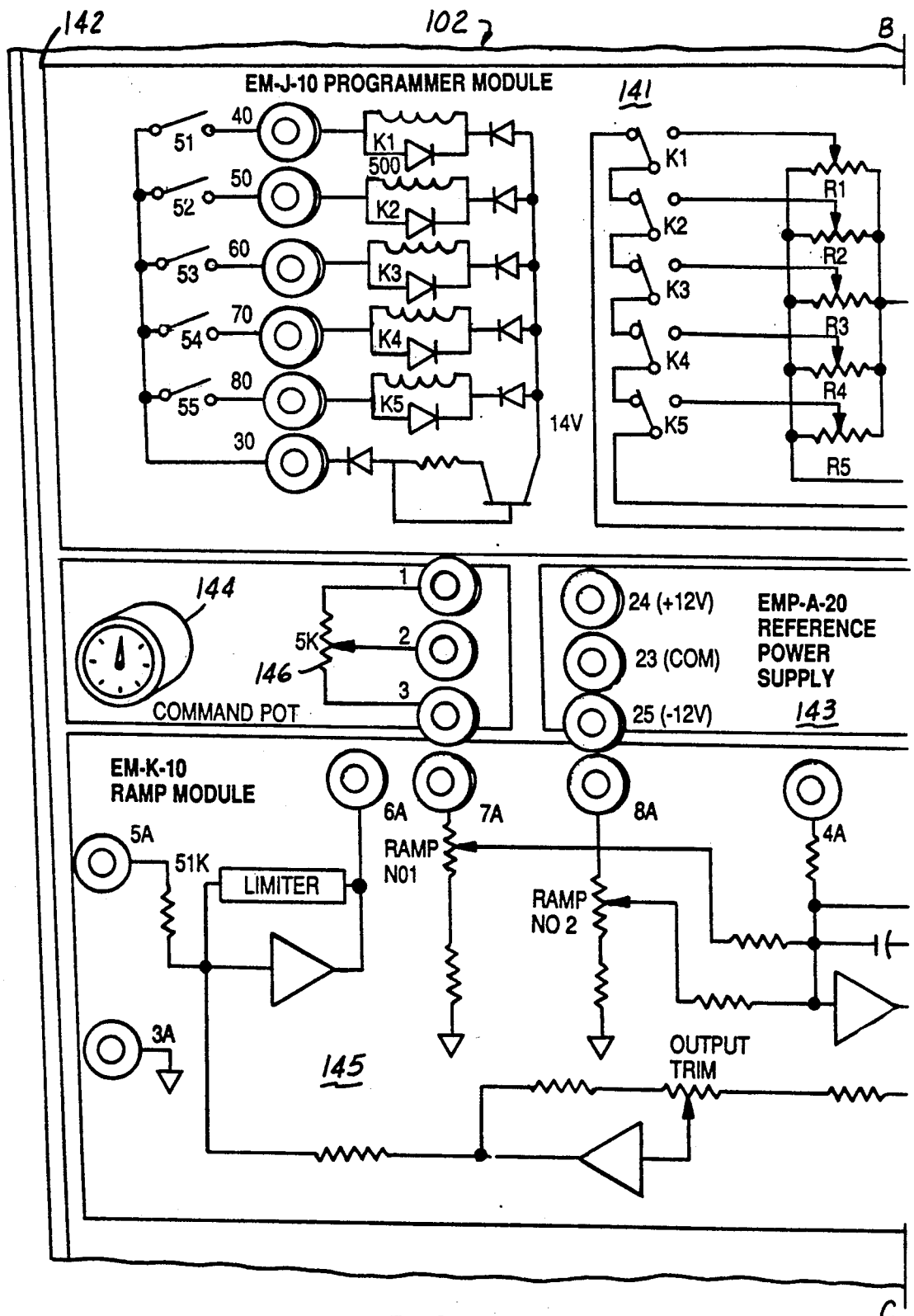
Figure 4C:
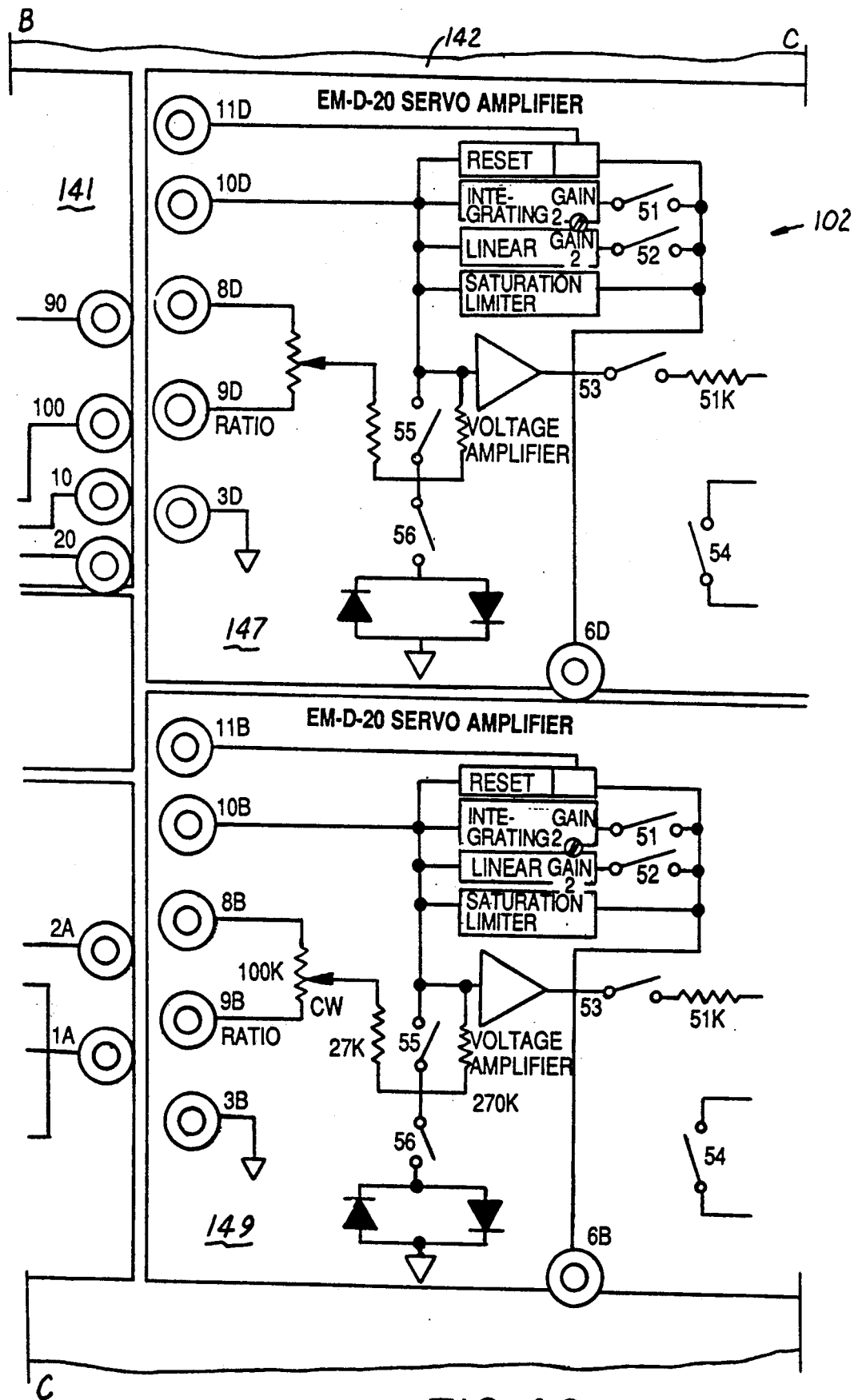
Figure 4D:
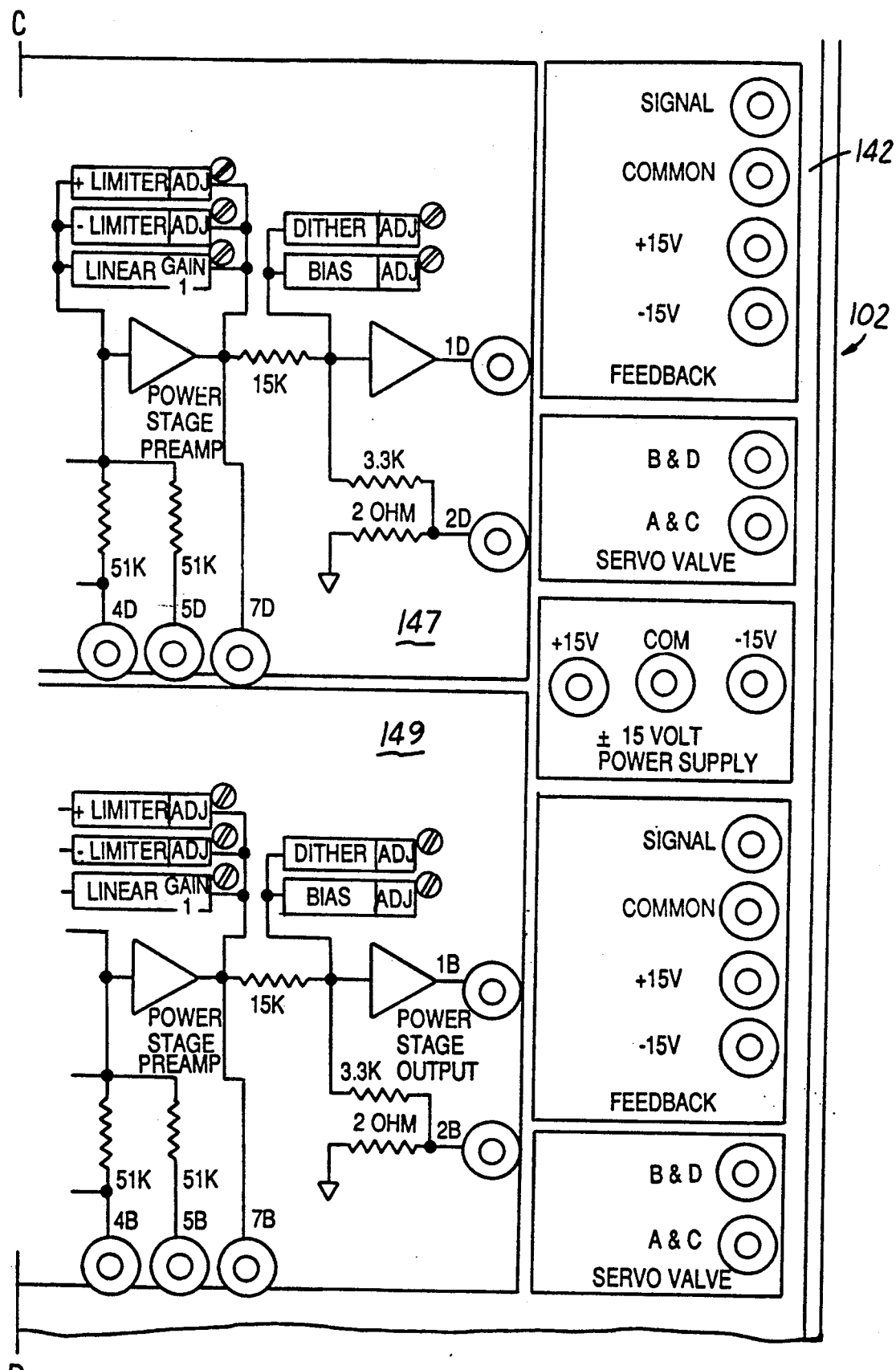

FIGS. 4A-4C illustrate servo valve controller module 102 in greater detail. In particular, FIG. 4A is a front perspective view illustrating the top panel 140 and the fragmented sloping front or operator panel 142 of module enclosure 148. FIGS. 4B-4C, interconnected along the lines B-C in each figure, and FIGS. 4C-4D, interconnected along the lines C-D in each figure, illustrate indicia and control structure on operator panel 142 in greater detail. Specifically, controller 102 includes a programmer module 141, a power supply 143, a ramp module 145, and two servo amplifiers 147, 149 contained within the module enclosure. Each such electronic assembly has input, output and control connections to single-conductor plug-type receptacles positioned on operator panel 142 in association with electrical schematic diagrams of the programmer module, reference power supply, ramp module (FIG. 4B) and servo amplifiers (FIGS. 4C and D) printed thereon. Most preferably, in accordance with one important feature of the present invention, the schematic illustrations on the operator panel of controller 102 (as well as controllers 100 and 104-106) correspond to schematic illustrations in operator manuals and the like, so that the trainee becomes familiar with actual unit construction while working with the training apparatus. A command control knob 144 (FIG. 4B) is also positioned on panel 142 and coupled to a variable resistor 146 schematically illustrated adjacent thereto, with terminals of the variable resistor being connected to appropriate receptacles on the front panel for feeding variable command voltage to the servo amplifiers and/or ramp module under control of the trainee. Moreover, the various adjustments schematically illustrated in each of the electronic assemblies, including both switches and variable resistors, are made available to the trainee through hinged access covers 146, 148 on upper panel 140. The electronics assemblies themselves are positioned beneath panel 140 in registry with hinged covers 146, 148.

Thus, all of the gains and other adjustments available to a technician in the field are made available to the trainee in exactly the same manner, and are also schematically illustrated to the trainee in the same manner as in the operator manual to be used in the field. The various receptacle terminals may be interconnected using conductors supplied with the apparatus (e.g., conductors 133 in FIG. 1). The servo amplifier outputs may likewise be connected to terminals along the right-hand edge of panel 142 (see FIG. 4D). Those terminals are connected internally of module 102 to the connectors 170 positioned along the back edge of top panel 140 (FIG. 4A), which in turn may be connected by suitable cables to servo valve 78 and amplifier 70 (FIGS. 1 and 2C) and tachometer 86. Power is applied to module 102 through an operator switch 172 (FIG. 4A), associated lamp 174 and AC adapters 176. Details of operation of the various electronic assemblies of controller 102 are fully disclosed in the Vickers Catalog referenced above and in other published manuals and the like, and do not per se form part of this invention.

Figure 5A:
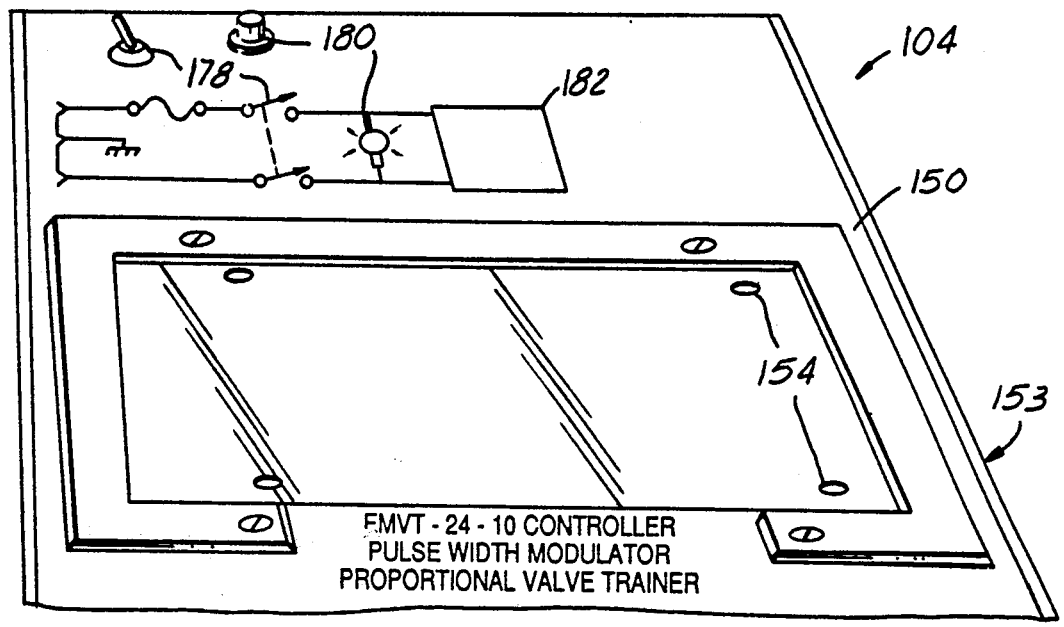
FIGS. 5A and 5B together comprise a front perspective view of a third control module 104 in the apparatus of FIG. 1.
Figure 5B:
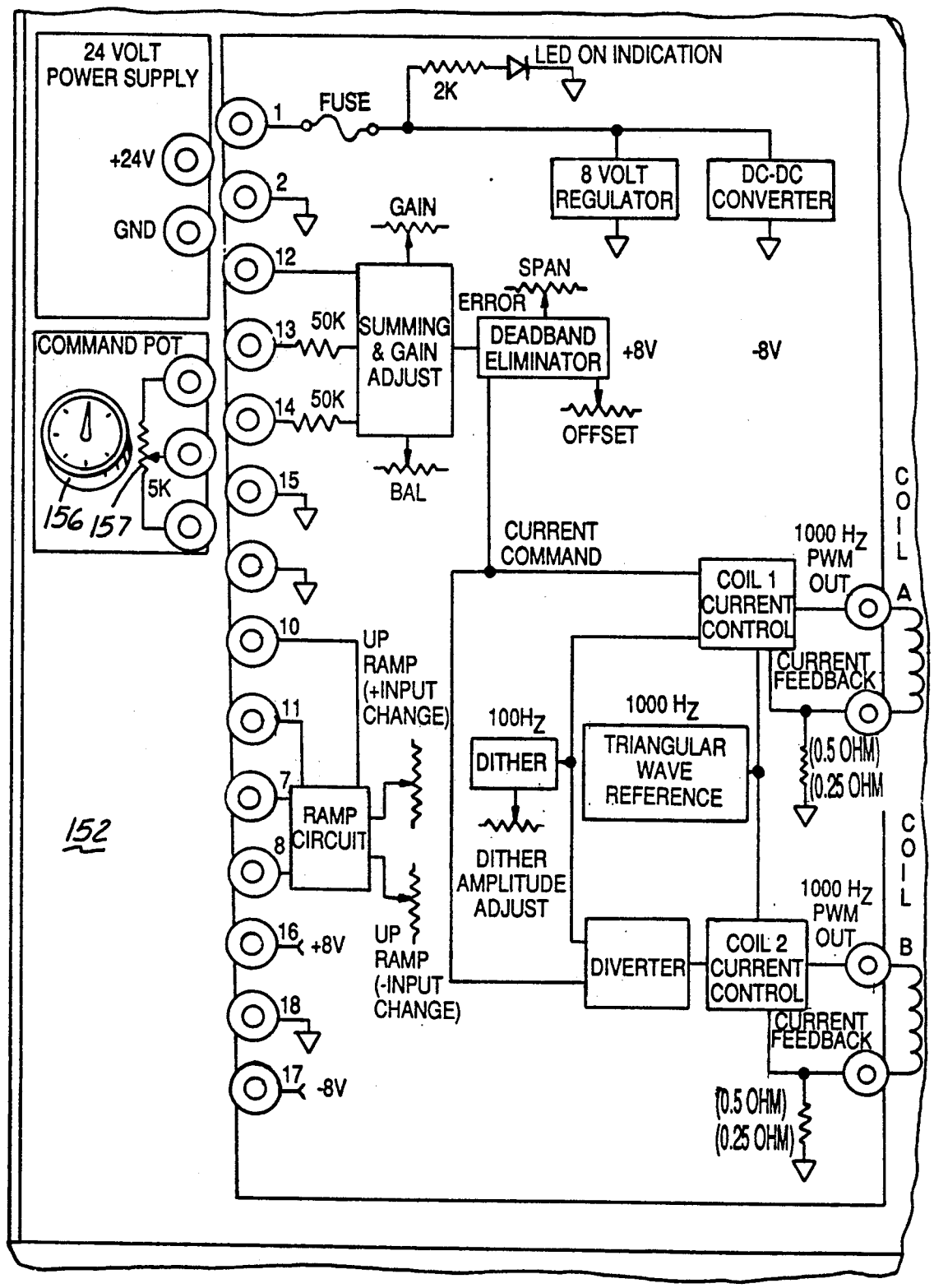

FIGS. 5A and 5B illustrate pulse width modulation controller 104, FIG. 5A being a perspective view illustrating top panel 150 and FIG. 5B being an elevational view illustrating sloping front operator panel 152. Controller 104 includes the standard pulse width modulation controller electronics assembly previously identified contained within the modular enclosure 153, with the electrical schematic diagram thereof being printed or otherwise affixed on operator panel 152 as shown in FIG. 5B. Again, all input, output and control connections to the controller electronics assembly are connected to plug-type receptacles on the controller front panel, and the receptacles are positioned in association with the schematic drawing. Likewise, all adjustments are schematically illustrated on the front panel and are made available to the operator through openings 154 in top panel 150, beneath and in registry with which the electronic control assembly is positioned. A command knob 156 is carried by panel 152 and coupled to a variable resistor 157 having terminals connected to associated receptacles so that the command voltage may be connected by suitable leads (133 in FIG. 1) to selected input terminals of the controller. Likewise, controller output terminals may be connected by conductors supplied with the trainer to the coils of solenoid valve 48. Power is supplied by a switch 178 (FIG. 5A with associated lamp 180 and power adapter 182.

Figure 6A:
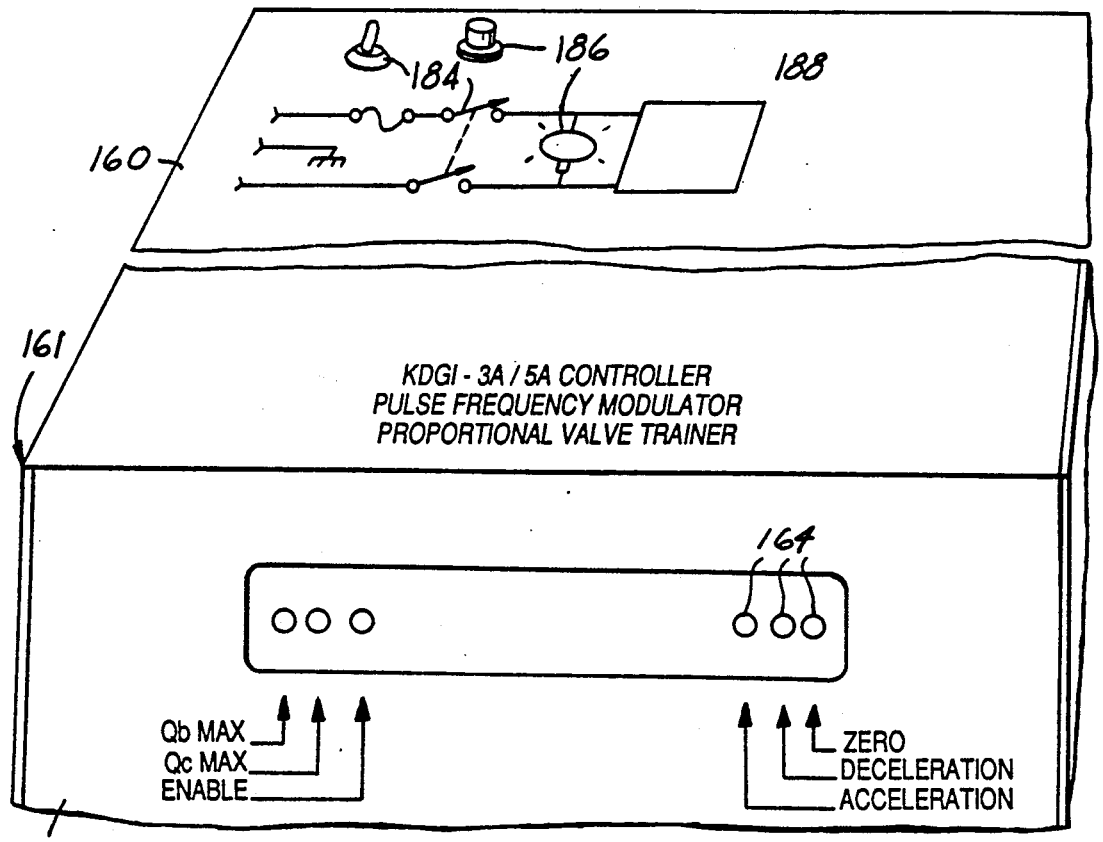
FIGS. 6A, 6B and 6C together comprise a front perspective view of the fourth electronic control module 106 in the apparatus of FIG. 1.
Figure 6B:
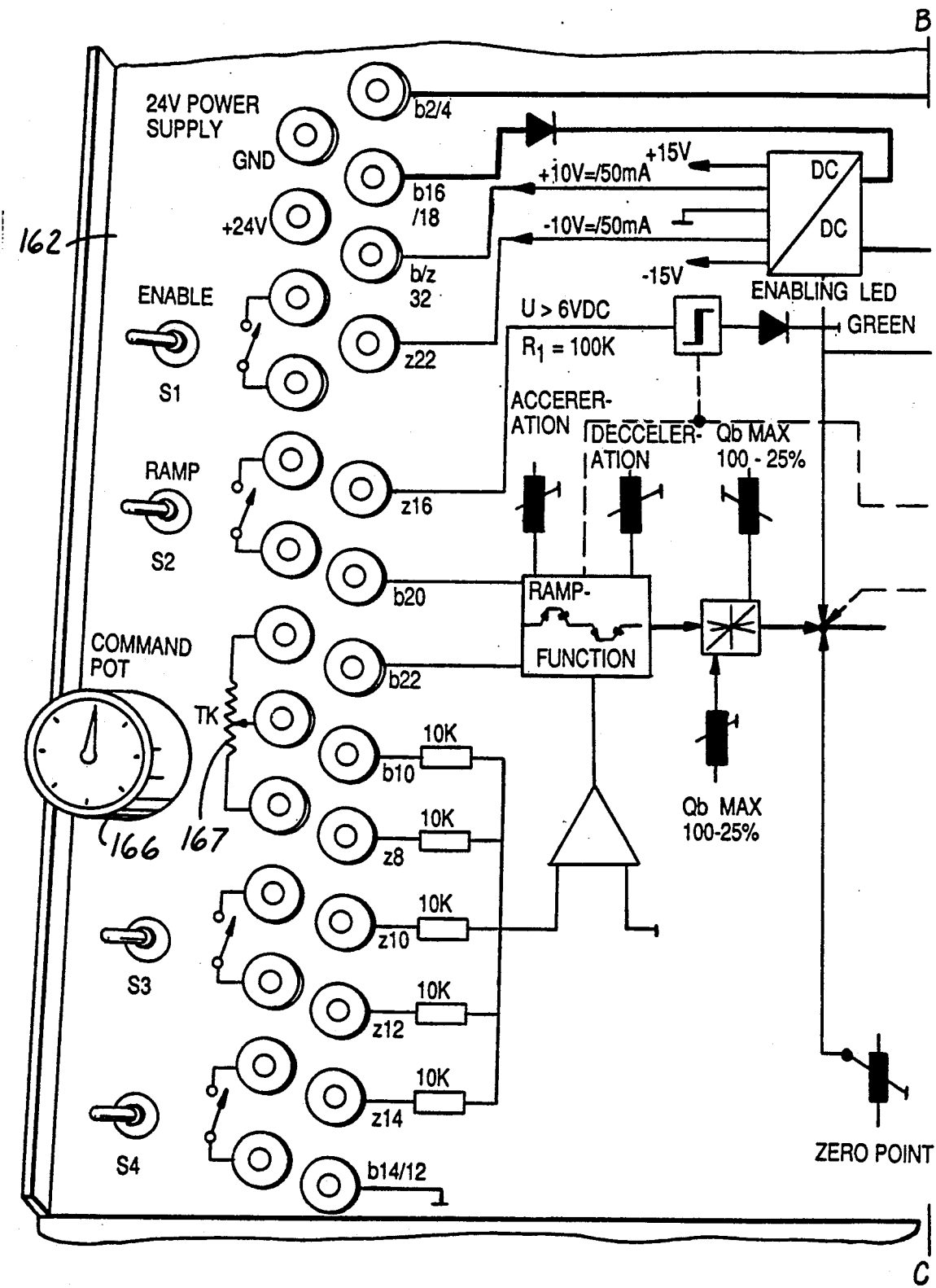
Figure 6C:
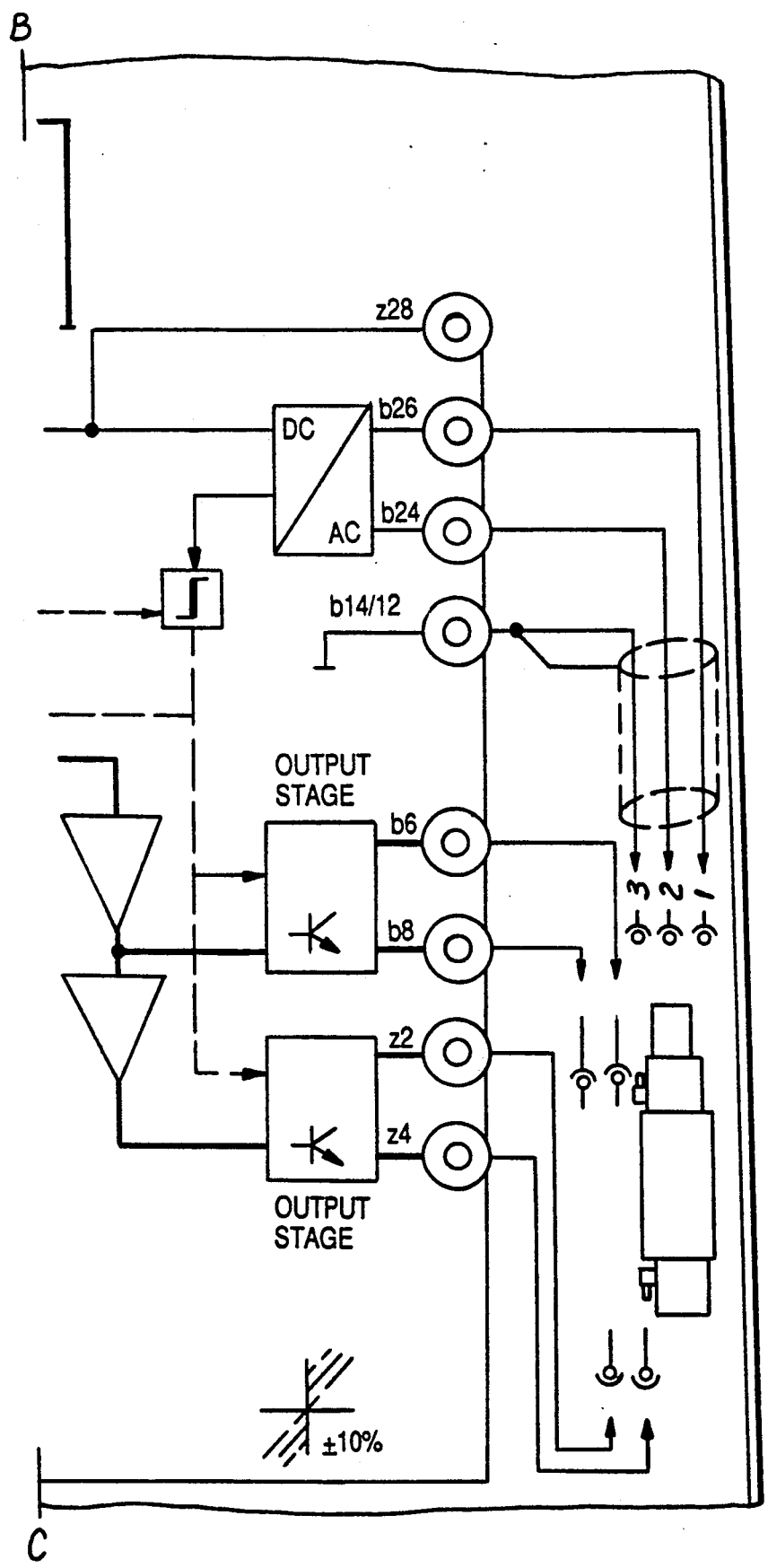

FIGS. 6A, 6B and 6C illustrate controller 106 for solenoid valve 56. FIG. 6A is a perspective view illustrating the top panel 160 of the controller module cabinet 161, as well as the upper portion of the sloping operator front panel 162, and FIGS. 6B and 6C, interconnected at the lines B-C in each figure, show the remainder of the front panel. Once again, a schematic diagram of the control electronics assembly contained within controller 106 is printed or otherwise affixed on controller front panel 162, with input/output and control connections of the control electronics being connected to plug-type receptacles on panel 162. Schematically illustrated circuit adjustments are made available to the operator through apertures 164 on panel 162, the electronic control assembly being mounted within cabinet 161 in registry therewith. Again, a command knob 166 is positioned on the front panel 162 and coupled to a variable resistor 167 having terminals made available at plugtype receptacles on the operator panel for selective connection to the controller input. Power is applied by a switch 184 on panel 160, with associated lamp 186 and power adapter 188. Circuit structural and functional details do not per se form part of the present invention.

There has thus been provided in accordance with the present invention an electrohydraulic training apparatus which fully satisfies all of the objects and aims previously set forth. Different types of electronically controlled hydraulic apparatus are mounted on a vertical panel readily accessible to the trainee and are selectively interconnectable with quick-disconnect lines and the like. Four different types of electronic controllers—specifically, a digital valve controller, a servo valve controller, a pulse width modulated proportional valve controller and a pulse frequency modulated proportional valve controller, are positioned on the training apparatus beneath and in front of the hydraulics panel. Each controller has standard control electronics packaged within an enclosure, with the electrical schematic diagram of the control electronics being printed on the enclosure front panel, and with the electronics being connected to receptacle connectors available on the front panel for selective interconnection by an operator. Each controller module also includes a variable resistor which may be controlled by the operator for varying command input to the associated control electronics, and thereby varying action at the associated electrohydraulic device. All gains and adjustments associated with the control electronics are schematically indicated on the associated module front panel and are made available to the operator.

The invention claimed is:

1. Apparatus for training an operator in use of electrohydraulic systems comprising:
    a plurality of differing electrohydraulic devices responsive to electronic control signals for performing hydraulic operations, each said device having associated operating characteristics which differ from those of other of said devices,
    electronic control means including means for selectively generating a plurality of differing electronic control signals, a plurality of preassembled electronic control assemblies, means enclosing said assemblies to form separate control modules, and means on said enclosing means for selectively electrically interconnecting components of said assemblies within each said module and connecting said modules to said devices,
    said enclosing means including an operator panel and fixed indicia on said operator panel coordinated with said assemblies for indicating options to an operator for said selective interconnection of components within said modules and to said devices, said indicia comprising electrical schematic diagrams of said electronic control assemblies contained within each said module,
    said selectively-connecting means comprising electrical connectors on said operator panel positioned within said indicia and electrically preconnected within said modules to corresponding locations in said assemblies to provide control inputs and outputs to and from said assemblies, and means for selectively interconnecting said connectors,
    means for selectively feeding said plurality of control signals to said devices, and
    means for generating a visually observable indication of operation at said devices, such that an operator can observe effects of said differing electronic control signals on said devices.

2. Apparatus for training an operator in use of electrohydraulic systems comprising:
    a plurality of differing electrohydraulic devices responsive to electronic control signals for performing hydraulic operations, each said device having associated operating characteristics which differ from those of other of said devices,
    electronic control means including means for selectively generating a plurality of differing electronic control signals, a plurality of preassembled electronic control assemblies, means enclosing said assemblies to form separate control modules, and means on said enclosing means for selectively electrically interconnecting components said assemblies within each said module and connecting said modules to said devices,
    said enclosing means including an operator panel and fixed indicia on said operator panel coordinated with said enclosed assemblies for indicating options to an operator for said selective interconnection of components within said modules and to said devices, said indicia comprising electrical schematic diagrams of said electronic control assemblies contained within each said module, said selectively-connecting means comprising electrical connectors on said operator panel positioned within said indicia and electrically preconnected within said modules to corresponding component locations in said assemblies to provide control inputs and outputs to and from said assemblies, and means for selectively interconnecting said connectors, means for selectively feeding said plurality of control signals to said devices, means for generating a visually observable indication of operation at said devices, such that an operator can observe effects of said differing electronic control signals on said devices, and a unitary assembly having a vertical back panel with said electrohydraulic devices mounted thereon, means mounting said electronic control means in front of and beneath said devices on said panel, and means for selectively interconnecting said devices with said control means and with a source of hydraulic fluid.

3. The apparatus set forth in claim 1 further comprising means for operator adjustment of operating characteristics of said control assemblies, and means in said indicia for indicating effect of such adjustment in control circuitry of said assemblies.

4. The apparatus set forth in claim 1 wherein at least one of said control assemblies comprises a personal computer including a keyboard for input of operator commands, an operator screen and means for feeding electronic control signals generated by said personal computer to an associated said device.

5. Apparatus for training an operator in use of electrohydraulic systems comprising:

a plurality of differing electrohydraulic devices responsive to electronic control signals for performing hydraulic operations, each said device having associated operating characteristics which differ from those of other said devices, said devices including electrohydraulic valves having ports for connection to a source of hydraulic fluid and to a load, and electromagnetic means responsive to said electronic control signals for controlling flow of fluid among said ports, said electrohydraulic valves including at least two valves responsive to electronic control signals of differing character, electronic control means including means for selectively generating a plurality of differing electronic control signals, said electronic control means including at least two electronic controllers for selectively generating said control signals of differing character, means for generating an electronic command signal and means for feeding said command signal to said controllers, each of said controllers including means for generating a said electronic control signal as a function of said command signal, each of said electronic controllers further including means responsive to an operator for selectively varying operating characteristics of said controllers such that said controllers generate said electronic control signals as selectively variable functions of said command signal, means for selectively feeding said plurality of control signals to said devices, and means for generating a visually observable indication of operation at said devices, such that an operator can observe effects of said differing electronic control signals on said devices, said electrohydraulic devices further including sensors for generating electronic signals indicative of operation at said devices; and said electronic control means further including means for selectively feeding said electronic sensor signals to said controllers, and means within each said controller for generating said electronic control signals as a combined function of said command signals and said sensor signals.

6. The apparatus set forth in claim 5 wherein each said controller includes means for selectively varying said combined function.

7. The apparatus set forth in claim 5 wherein said electronic control means includes a plurality of preassembled electronic control assemblies, means enclosing said assemblies to form separate control modules, and means on said enclosing means for selectively electrically interconnecting said assemblies within each said module and connecting said modules to said devices.

8. The apparatus set forth in claim 7 wherein said enclosing means includes an operator panel and fixed indicia on said operator panel coordinated with said enclosed assemblies for indicating options to an operator for said selective interconnection within said modules and to said devices.

9. The apparatus set forth in claim 8 wherein said fixed indicia comprises electric schematic diagram of said electronic control assemblies contained within each said module.

10. The apparatus set forth in claim 9 wherein said selectively-connecting means comprises electrical connectors on said operator panel positioned within said indicia and electrically preconnected within said modules to corresponding component locations in said assemblies to provide control inputs and outputs to and from said assemblies, and means for selectively interconnecting said connectors.

11. Apparatus for training an operator in use of electrohydraulic systems comprised of system components from a predetermined system product line, said apparatus comprising:

a base having a generally vertical back panel and a source of hydraulic fluid, a plurality of differing electrohydraulic devices in said product line mounted on said back panel, each said device being adapted to perform hydraulic operations as differing predetermined functions of associated differing electronic control signals and being associated with fixed indicia on said back panel identifying said device in said product line, a plurality of differing electronic controllers mounted on said base beneath and in front of said devices on said back panel, each of said controllers including means for generating an electronic control signal adapted to operate at least one of said devices and bearing fixed indicia identifying said controller in said system product line, means for selectively interconnecting said devices with said controllers and said source, and means for generating a visually observable indication of operation at said devices said controllers including a plurality of preassembled electronic controller assemblies from said system product line, each having multiple selectable input and control connections, means enclosing said assemblies and having an operator panel, and means on said panel electrically connected to said assemblies for directing input, output and control connections to said assemblies, said fixed controller-identifying indicia including indicia positioned adjacent to said connections-directing means for identifying said input, output and control connections.

12. The apparatus set forth in claim 11 wherein each of said controller assemblies includes means for selectively adjusting operating characteristics thereof, wherein said controllers further include means on said operator panel for adjusting said operating characteristics of said assemblies, and wherein said fixed controller-identifying indicia includes indicia for indicating effect of said adjustment on electronic circuitry of said assemblies.

13. The apparatus set forth in claim 12 wherein said operator panel includes at least one opening in registry with each of said assemblies for permitting direct operator adjustment of said operating characteristics of said assemblies through said openings in said panel.

14. The apparatus set forth in claim 12 wherein said fixed controller-identifying indicia includes an electrical schematic diagram of each said controller assembly on said panel.

15. The apparatus set forth in claim 14 wherein said electrohydraulic devices further include sensors for generating electronic signals indicative of operation at said devices, said selectively-interconnecting means including means for selectively connecting said sensors to said input, output and control connections.

16. The apparatus set forth in claim 15 wherein each said controller includes means for generating a command signal, and means for providing said electronic control signal as a combined function of said command and sensor signals.

17. The apparatus set forth in claim 15 wherein said multiple selectable input, output and control connections comprise female receptacle-type connectors positioned on said operator panel at locations corresponding to input, output and control connections in said schematic diagrams, and wherein said selectively-interconnecting means comprises cables having male plug-type connectors, for selective connection to said receptacle-type connectors.

18. The apparatus set forth in claim 17 wherein said selectively-interconnecting means includes quick-disconnect hydraulic fittings on said devices, and quick-disconnect hydraulic hoses for selective connection to said devices.

19. The apparatus set forth in claim 18 wherein said base comprises a generally rectangular cabinet having a flat top with said back panel upstanding therefrom, said controllers comprising individual control modules removably received on said flat top.

20. The apparatus set forth in claim 19 wherein said modules have sloping front panels which align in assembly to form said operator panel.

21. The apparatus set forth in claim 19 wherein said source is carried within said cabinet.

22. The apparatus set forth in claim 21 further comprising wheels moveably supporting said base.

23. Apparatus for training an operator in use of electrohydraulic systems comprising:

a plurality of differing electrohydraulic devices responsive to electronic control signals for performing hydraulic operations, each said device having associated operating characteristics which differ from those of other of said devices, electronic control means including means for selectively generating a plurality of differing electronic control signals, at least one preassembled electronic control assembly, means enclosing said assembly to form a control module, and means on said enclosing means for selectively electrically interconnecting components of said assembly within said module and connecting said module to said devices, said enclosing means including an operator panel and fixed indicia on said operator panel coordinated with said enclosed assembly for indicating options to an operator for said selective interconnection of components within said module and to said devices, said indicia comprising an electrical schematic diagram of said electronic control assembly contained within said module, said selectively-connecting means comprising electrical connectors on said operator panel positioned within said schematic diagram and electrically preconnected within said module to corresponding component locations in said assembly to provide control inputs and outputs to and from said assembly, and means for selectively interconnecting said connectors, means for selectively feeding said plurality of control signals to said devices, and means for generating a visually observable indication of operation at said devices, such that an operator can observe effects of said differing electronic control signals on said devices.

24. The apparatus set forth in claim 23 wherein said electronic control means includes a plurality of differing preassembled electronic control assemblies and means enclosing said assemblies to form separate control modules, each of said modules having a said operator panel bearing fixed electrical schematic indicia of the preassembled control assembly within that module.

25. The apparatus set forth in claim 23 further comprising means for operator adjustment of operating characteristics of said control assembly, and means in said schematic diagram for indicating effect of such adjustment in control circuitry of said assembly.

26. The apparatus set forth in claim 25 wherein said control assembly comprises a personal computer including a keyboard for input of operator commands, an operator screen and means for feeding electronic control signals generated by said personal computer to an associated said device.

27. The apparatus set forth in claim 23 wherein said devices include electrohydraulic valves having ports for connection to a source of hydraulic fluid and to a load, and electromagnetic means responsive to said electronic control signals for controlling flow of fluid among said ports.

28. The apparatus set forth in claim 27 wherein electrohydraulic valves associated with said plurality of devices include at least two valves responsive to electronic control signals of differing character, and wherein said electronic controls means includes at least two electronic controllers for selectively generating said control signals of differing character.

29. The apparatus set forth in claim 28 wherein said electronic control means includes means for generating an electronic command signal and means for feeding said command signal to said controllers, and wherein each of said controllers includes means for generating said electronic control signal as a function of said command signal.

30. The apparatus set forth in claim 29 wherein each of said electronic controllers further includes means responsive to an operator for selectively varying operating characteristics of said controllers such that said controllers generate said electronic control signals as selectively variable functions of said command signal.

31. The apparatus set forth in claim 30 wherein said electrohydraulic devices further include sensors for generating electronic signals indicative of operation at said devices; and wherein said electronic control means further includes means for selectively feeding said electronic sensor signals to said controllers, and means within each said controller for generating said electronic control signal as a combined function of said command signal and said sensor signals.

32. The apparatus set forth in claim 23 comprising a unitary assembly having a vertical back panel with said electrohydraulic devices mounted thereon, means mounting said electronic control means in front of and beneath said devices on said panel, and means for selectively interconnecting said devices with said control means and with a source of hydraulic fluid.

33. The apparatus set forth in claim 32 wherein said selectively interconnecting means includes quick-disconnect hydraulic fittings on said devices, and quick-disconnect hydraulic hoses for selective connection to said devices.

* * * * *